US012002325B2

(12) United States Patent
Huke et al.

(10) Patent No.: US 12,002,325 B2
(45) Date of Patent: Jun. 4, 2024

(54) ON DECK WAGERING

(71) Applicant: AdrenalineIP, Washington, DC (US)

(72) Inventors: Casey Alexander Huke, Washington, DC (US); John Cronin, Jericho, VT (US); Joseph W. Beyers, Saratoga, CA (US); Michael D'Andrea, Burlington, VT (US)

(73) Assignee: AdrenalineIP, Washington, DC (US)

( * ) Notice: Subject to any disclaimer, the term of this patent is extended or adjusted under 35 U.S.C. 154(b) by 0 days.

(21) Appl. No.: 17/522,484

(22) Filed: Nov. 9, 2021

(65) Prior Publication Data

US 2022/0148366 A1 May 12, 2022

Related U.S. Application Data

(60) Provisional application No. 63/111,202, filed on Nov. 9, 2020.

(51) Int. Cl.
*G07F 17/32* (2006.01)

(52) U.S. Cl.
CPC ........ *G07F 17/323* (2013.01); *G07F 17/3288* (2013.01)

(58) Field of Classification Search
CPC ............... G07F 17/3288; G07F 17/323; G07F 17/3218; G06Q 50/34; G06F 1/163
See application file for complete search history.

(56) References Cited

U.S. PATENT DOCUMENTS

| | | | | |
|---|---|---|---|---|
| 9,005,016 | B2 | 4/2015 | Amaitis et al. | |
| 10,720,012 | B2 | 7/2020 | Amaitis et al. | |
| 2012/0034974 | A1* | 2/2012 | Amaitis | G06Q 50/34 463/25 |
| 2012/0100918 | A1 | 4/2012 | Ginsberg et al. | |
| 2012/0214575 | A1* | 8/2012 | Amaitis | G07F 17/3269 463/25 |
| 2019/0122482 | A1* | 4/2019 | Amaitis | G06Q 50/34 |
| 2019/0295382 | A1* | 9/2019 | Huke | G07F 17/3209 |
| 2019/0355204 | A1* | 11/2019 | Edgar | G07F 17/3241 |
| 2020/0265684 | A1* | 8/2020 | Hufnagl-Abraham | G07F 17/3267 |
| 2020/0294366 | A1* | 9/2020 | Huke | G07F 17/323 |

* cited by examiner

*Primary Examiner* — James S. McClellan
*Assistant Examiner* — Ross A Williams
(74) *Attorney, Agent, or Firm* — Maier & Maier, PLLC

(57) ABSTRACT

A method of wagering on micro markets that are not related to the current play. For example, wagering on the outcome of the third batter due up in the inning.

13 Claims, 2 Drawing Sheets

ON DECK WAGERING

FIELD

The embodiments are generally related to play-by-play wagering on live sporting events.

BACKGROUND

Micro-betting or micro-wagering has become very popular among sports fans. In order to facilitate this, gaming systems must be able to calculate the odds of the outcome of a play quickly.

A problem that arises is that in some sporting events, the window of time between the start of the play and the play's outcome is too short for some bettors who may be slow to react or may prefer to give deeper thought to their wagers.

Wagers too far in the future, or based on a combination of events, no longer meet the micro-betting market's needs and are closer to traditional sports betting instead.

SUMMARY

Embodiments provide various manners of providing odds and wagers on future events. In one embodiment, a method for providing one or more wagers for an upcoming action in a live sporting event can include collecting data about the end of a past play in the live sporting event; collecting data about a current play in the live sporting event until a threshold amount of data is collected; stopping collection of the data of the current play in the live sporting event before the current play is completed; comparing the collected data about the end of the past play and the collected data about the current play to historical play data; determining odds on a future action of the live sporting event that will begin after the current play is completed; and displaying the odds as an offered wager.

In another embodiment, a system for providing odds on a future play in a live sporting event before a conclusion of a current play in the live sporting event can include one or more sensors that determine when a past play in the live sporting event has ended; data collected from a historical plays database that contains play data for the type of sport being played in the live sporting event; a next action module that collects data from a current play in the live sporting event, where the data from the current play in the live sporting event is collected before the conclusion of the current play, and calculates odds for a next action that will take place after the current play in the live sporting event ends; and a wager offered based on the calculated odds for the next action.

In still another embodiment, a method of displaying a wager can include displaying information regarding a past play in a live sporting event; displaying information regarding a current play in a live sporting event; and displaying wager information for a next action in the live sporting event during the display of the information regarding the current play in the live sporting event, where the next action is at least one of a next play and a player substitution, and the next action begins after the current play in the live sporting event ends.

BRIEF DESCRIPTIONS OF THE DRAWINGS

The accompanying drawings illustrate various embodiments of systems, methods, and various other aspects of the embodiments. Any person with ordinary art skill in the art will appreciate that the illustrated element boundaries (e.g., boxes, groups of boxes, or other shapes) in the figures represent an example of the boundaries. It may be understood that, in some examples, one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Figure 1:
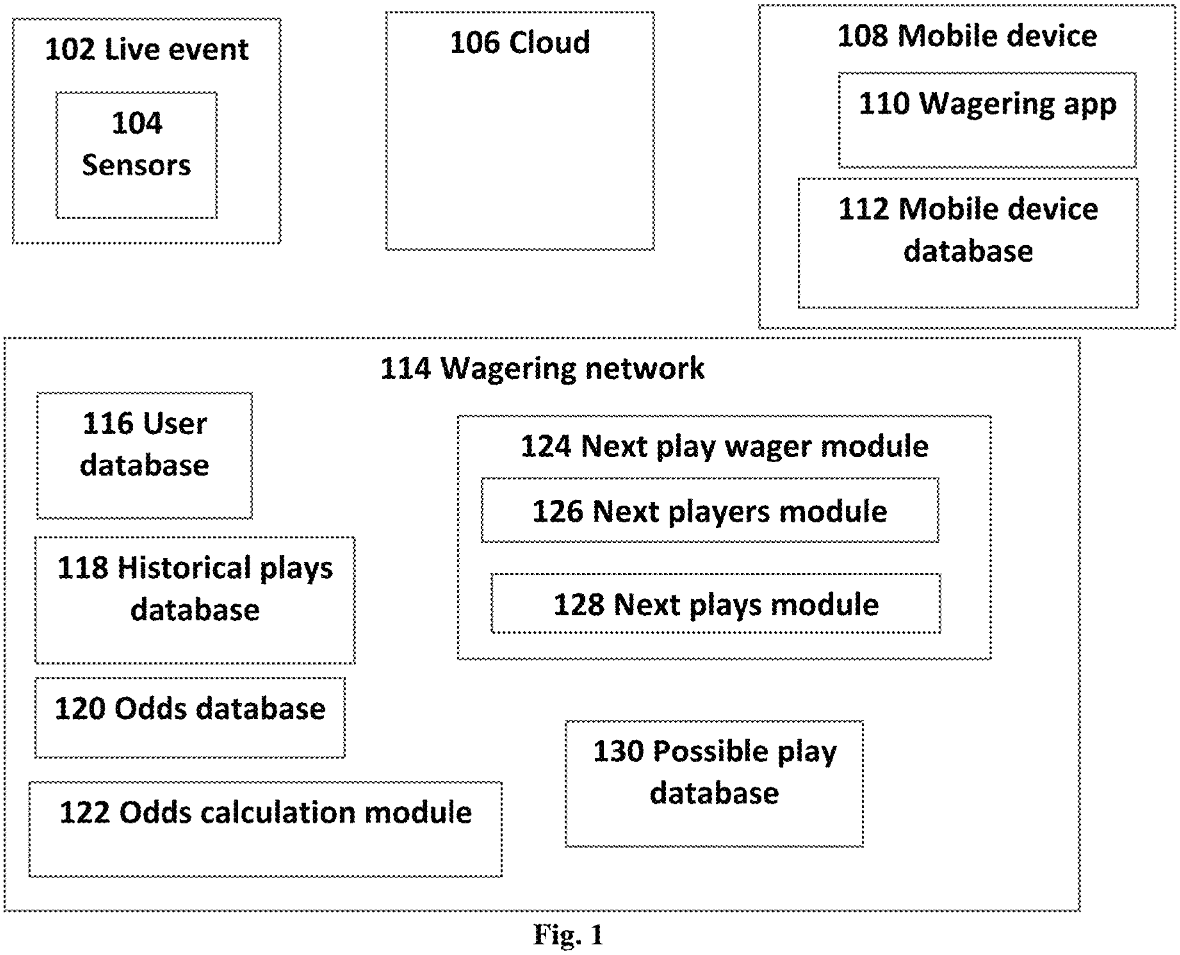
FIG. 1 illustrates an on-deck wagering system, according to an embodiment.

Aspects of the present invention are disclosed in the following description and related figures directed to specific embodiments of the invention. Those of ordinary skill in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word exemplary means serving as an example, instance or illustration. The embodiments described herein are not limiting, but rather are exemplary only. It should be understood that the described embodiments are not necessarily to be construed as preferred or advantageous over other embodiments. Moreover, the terms embodiments of the invention, embodiments or invention do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, a computer configured to perform the described action.

With respect to the embodiments, a summary of terminology used herein is provided.

An action refers to a specific play or specific movement in a sporting event. For example, an action may determine which players were involved during a sporting event. In some embodiments, an action may be a throw, shot, pass, swing, kick, hit, performed by a participant in a sporting event. In some embodiments, an action may be a strategic decision made by a participant in the sporting event such as a player, coach, management, etc. In some embodiments, an action may be a penalty, foul, or type of infraction occurring in a sporting event. In some embodiments, an action may include the participants of the sporting event. In some embodiments, an action may include beginning events of sporting event, for example opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, eSports, etc. Actions can be integrated into the embodiments in a variety of manners.

A "bet" or "wager" is to risk something, usually a sum of money, against someone else's or an entity on the basis of the outcome of a future event, such as the results of a game or event. It may be understood that non-monetary items may be the subject of a "bet" or "wager" as well, such as points or anything else that can be quantified for a "bet" or "wager". A bettor refers to a person who bets or wagers. A bettor may also be referred to as a user, client, or participant throughout the present invention. A "bet" or "wager" could be made for obtaining or risking a coupon or some enhancements to the sporting event, such as better seats, VIP treatment, etc. A "bet" or "wager" can be done for certain amount or for a future time. A "bet" or "wager" can be done for being able to answer a question correctly. A "bet" or "wager" can be done within a certain period of time. A "bet" or "wager" can be integrated into the embodiments in a variety of manners.

A "book" or "sportsbook" refers to a physical establishment that accepts bets on the outcome of sporting events. A "book" or "sportsbook" system enables a human working with a computer to interact, according to set of both implicit and explicit rules, in an electronically powered domain for the purpose of placing bets on the outcome of sporting event. An added game refers to an event not part of the typical menu of wagering offerings, often posted as an accommodation to patrons. A "book" or "sportsbook" can be integrated into the embodiments in a variety of manners.

To "buy points" means a player pays an additional price (more money) to receive a half-point or more in the player's favor on a point spread game. Buying points means you can move a point spread, for example up to two points in your favor. "Buy points" can be integrated into the embodiments in a variety of manners.

The "price" refers to the odds or point spread of an event. To "take the price" means betting the underdog and receiving its advantage in the point spread. "Price" can be integrated into the embodiments in a variety of manners.

"No action" means a wager in which no money is lost or won, and the original bet amount is refunded. "No action" can be integrated into the embodiments in a variety of manners.

The "sides" are the two teams or individuals participating in an event: the underdog and the favorite. The term "favorite" refers to the team considered most likely to win an event or game. The "chalk" refers to a favorite, usually a heavy favorite. Bettors who like to bet big favorites are referred to "chalk eaters" (often a derogatory term). An event or game in which the sports book has reduced its betting limits, usually because of weather or the uncertain status of injured players is referred to as a "circled game." "Laying the points or price" means betting the favorite by giving up points. The term "dog" or "underdog" refers to the team perceived to be most likely to lose an event or game. A "longshot" also refers to a team perceived to be unlikely to win an event or game. "Sides", "favorite", "chalk", "circled game", "laying the points price", "dog" and "underdog" can be integrated into the embodiments in a variety of manners.

The "money line" refers to the odds expressed in terms of money. With money odds, whenever there is a minus (−) the player "lays" or is "laying" that amount to win (for example $100); where there is a plus (+) the player wins that amount for every $100 wagered. A "straight bet" refers to an individual wager on a game or event that will be determined by a point spread or money line. The term "straight-up" means winning the game without any regard to the "point spread"; a "money-line" bet. "Money line", "straight bet", "straight-up" can be integrated into the embodiments in a variety of manners.

The "line" refers to the current odds or point spread on a particular event or game. The "point spread" refers to the margin of points in which the favored team must win an event by to "cover the spread." To "cover" means winning by more than the "point spread". A handicap of the "point spread" value is given to the favorite team so bettors can choose sides at equal odds. "Cover the spread" means that a favorite win an event with the handicap considered or the underdog wins with additional points. To "push" refers to when the event or game ends with no winner or loser for wagering purposes, a tie for wagering purposes. A "tie" is a wager in which no money is lost or won because the teams' scores were equal to the number of points in the given "point spread". The "opening line" means the earliest line posted for a particular sporting event or game. The term "pick" or "pick 'em" efers to a game when neither team is favored in an event or game. "Line", "cover the spread", "cover", "tie", "pick" and "pick-em" can be integrated into the embodiments in a variety of manners.

To "middle" means to win both sides of a game; wagering on the "underdog" at one point spread and the favorite at a different point spread and winning both sides. For example, if the player bets the underdog +4½ and the favorite −3½ and the favorite wins by 4, the player has middled the book and won both bets. "Middle" can be integrated into the embodiments in a variety of manners.

Digital gaming refers to any type of electronic environment that can be controlled or manipulated by a human user for entertainment purposes. A system that enables a human and a computer to interact according to set of both implicit and explicit rules, in an electronically powered domain for the purpose of recreation or instruction. "eSports" refers to a form of sports competition using video games, or a multiplayer video game played competitively for spectators, typically by professional gamers. Digital gaming and "eSports" can be integrated into the embodiments in a variety of manners.

The term event refers to a form of play, sport, contest, or game, especially one played according to rules and decided by skill, strength, or luck. In some embodiments, an event may be football, hockey, basketball, baseball, golf, tennis, soccer, cricket, rugby, MMA, boxing, swimming, skiing, snowboarding, horse racing, car racing, boat racing, cycling, wrestling, Olympic sport, etc. Event can be integrated into the embodiments in a variety of manners.

The "total" is the combined number of runs, points or goals scored by both teams during the game, including overtime. The "over" refers to a sports bet in which the player wagers that the combined point total of two teams will be more than a specified total. The "under" refers to bets that the total points scored by two teams will be less than a certain figure. "Total", "over", and "under" can be integrated into the embodiments in a variety of manners.

A "parlay" is a single bet that links together two or more wagers; to win the bet, the player must win all the wagers in the "parlay". If the player loses one wager, the player loses the entire bet. However, if he wins all the wagers in the "parlay", the player wins a higher payoff than if the player had placed the bets separately. A "round robin" is a series of parlays. A "teaser" is a type of parlay in which the point spread, or total of each individual play is adjusted. The price of moving the point spread (teasing) is lower payoff odds on winning wagers. "Parlay", "round robin", "teaser" can be integrated into the embodiments in a variety of manners.

A "prop bet" or "proposition bet" means a bet that focuses on the outcome of events within a given game. Props are often offered on marquee games of great interest. These include Sunday and Monday night pro football games, various high-profile college football games, major college bowl games and playoff and championship games. An example of a prop bet is "Which team will score the first touchdown?" "Prop bet" or "proposition bet" can be integrated into the embodiments in a variety of manners.

A "first-half bet" refers to a bet placed on the score in the first half of the event only and only considers the first half of the game or event. The process in which you go about placing this bet is the same process that you would use to place a full game bet, but as previously mentioned, only the first half is important to a first-half bet type of wager. A "half-time bet" refers to a bet placed on scoring in the second half of a game or event only. "First-half-bet" and "half-time-bet" can be integrated into the embodiments in a variety of manners.

A "futures bet" or "future" refers to the odds that are posted well in advance on the winner of major events, typical future bets are the Pro Football Championship, Collegiate Football Championship, the Pro Basketball Championship, the Collegiate Basketball Championship, and the Pro Baseball Championship. "Futures bet" or "future" can be integrated into the embodiments in a variety of manners.

The "listed pitchers" is specific to a baseball bet placed only if both of the pitchers scheduled to start a game actually start. If they don't, the bet is deemed "no action" and refunded. The "run line" in baseball, refers to a spread used instead of the money line. "Listed pitchers" and "no action" and "run line" can be integrated into the embodiments in a variety of manners.

The term "handle" refers to the total amount of bets taken. The term "hold" refers to the percentage the house wins. The term "juice" refers to the bookmaker's commission, most commonly the 11 to 10 bettors lay on straight point spread wagers: also known as "vigorish" or "vig". The "limit" refers to the maximum amount accepted by the house before the odds and/or point spread are changed. "Off the board" refers to a game in which no bets are being accepted. "Handle", "juice", vigorish", "vig" and "off the board" can be integrated into the embodiments in a variety of manners.

"Casinos" are a public room or building where gambling games are played. "Racino" is a building complex or grounds having a racetrack and gambling facilities for playing slot machines, blackjack, roulette, etc. "Casino" and "Racino" can be integrated into the embodiments in a variety of manners.

Customers are companies, organizations or individual that would deploy, for fees, and may be part of, or perform, various system elements or method steps in the embodiments.

Managed service user interface service is a service that can help customers (1) manage third parties, (2) develop the web, (3) do data analytics, (4) connect thru application program interfaces and (4) track and report on player behaviors. A managed service user interface can be integrated into the embodiments in a variety of manners.

Managed service risk management services are services that assists customers with (1) very important person management, (2) business intelligence, and (3) reporting. These managed service risk management services can be integrated into the embodiments in a variety of manners.

Managed service compliance service is a service that helps customers manage (1) integrity monitoring, (2) play safety, (3) responsible gambling and (4) customer service assistance. These managed service compliance services can be integrated into the embodiments in a variety of manners.

Managed service pricing and trading service is a service that helps customers with (1) official data feeds, (2) data visualization and (3) land based, on property digital signage. These managed service pricing and trading services can be integrated into the embodiments in a variety of manners.

Managed service and technology platform are services that helps customers with (1) web hosting, (2) IT support and (3) player account platform support. These managed service and technology platform services can be integrated into the embodiments in a variety of manners.

Managed service and marketing support services are services that help customers (1) acquire and retain clients and users, (2) provide for bonusing options and (3) develop press release content generation. These managed service and marketing support services can be integrated into the embodiments in a variety of manners.

Payment processing services are those services that help customers that allow for (1) account auditing and (2) withdrawal processing to meet standards for speed and accuracy. Further, these services can provide for integration of global and local payment methods. These payment processing services can be integrated into the embodiments in a variety of manners.

Engaging promotions allow customers to treat your players to free bets, odds boosts, enhanced access and flexible cashback to boost lifetime value. Engaging promotions can be integrated into the embodiments in a variety of manners.

"Cash out" or "pay out" or "payout" allow customers to make available, on singles bets or accumulated bets with a partial cash out where each operator can control payouts by managing commission and availability at all times. The "cash out" or "pay out" or "payout" can be integrated into the embodiments in a variety of manners, including both monetary and non-monetary payouts, such as points, prizes, promotional or discount codes, and the like.

"Customized betting" allow customers to have tailored personalized betting experiences with sophisticated tracking and analysis of players' behavior. "Customized betting" can be integrated into the embodiments in a variety of manners.

Kiosks are devices that offer interactions with customers clients and users with a wide range of modular solutions for both retail and online sports gaming. Kiosks can be integrated into the embodiments in a variety of manners.

Business Applications are an integrated suite of tools for customers to manage the everyday activities that drive sales, profit, and growth, by creating and delivering actionable insights on performance to help customers to manage the sports gaming. Business Applications can be integrated into the embodiments in a variety of manners.

State based integration allows for a given sports gambling game to be modified by states in the United States or other countries, based upon the state the player is in, based upon mobile phone or other geolocation identification means. State based integration can be integrated into the embodiments in a variety of manners.

Game Configurator allow for configuration of customer operators to have the opportunity to apply various chosen or newly created business rules on the game as well as to parametrize risk management. Game configurator can be integrated into the embodiments in a variety of manners.

"Fantasy sports connector" are software connectors between method steps or system elements in the embodiments that can integrate fantasy sports. Fantasy sports allow a competition in which participants select imaginary teams from among the players in a league and score points according to the actual performance of their players. For example, if a player in a fantasy sports is playing at a given real time sports, odds could be changed in the real time sports for that player.

Software as a service (or SaaS) is a method of software delivery and licensing in which software is accessed online via a subscription, rather than bought and installed on individual computers. Software as a service can be integrated into the embodiments in a variety of manners.

Synchronization of screens means synchronizing bets and results between devices, such as TV and mobile, PC and wearables. Synchronization of screens can be integrated into the embodiments in a variety of manners.

Automatic content recognition (ACR) is an identification technology to recognize content played on a media device or present in a media file. Devices containing ACR support enable users to quickly obtain additional information about the content they see without any user-based input or search efforts. To start the recognition, a short media clip (audio, video, or both) is selected. This clip could be selected from within a media file or recorded by a device. Through algorithms such as fingerprinting, information from the actual perceptual content is taken and compared to a database of reference fingerprints, each reference fingerprint corresponding to a known recorded work. A database may contain metadata about the work and associated information, including complementary media. If the fingerprint of the media clip is matched, the identification software returns the corresponding metadata to the client application. For example, during an in-play sports game a "fumble" could be recognized and at the time stamp of the event, metadata such as "fumble" could be displayed. Automatic content recognition (ACR) can be integrated into the embodiments in a variety of manners.

Joining social media means connecting an in-play sports game bet or result to a social media connection, such as a FACEBOOK® chat interaction. Joining social media can be integrated into the embodiments in a variety of manners.

Augmented reality means a technology that superimposes a computer-generated image on a user's view of the real world, thus providing a composite view. In an example of this invention, a real time view of the game can be seen and a "bet" which is a computer-generated data point is placed above the player that is bet on. Augmented reality can be integrated into the embodiments in a variety of manners.

Some embodiments of this disclosure, illustrating all its features, will now be discussed in detail. It can be understood that the embodiments are intended to be open ended in that an item or items used in the embodiments is not meant to be an exhaustive listing of such item or items, or meant to be limited to only the listed item or items.

It can be noted that as used herein and in the appended claims, the singular forms "a," "an," and "the" include plural references unless the context clearly dictates otherwise. Although any systems and methods similar or equivalent to those described herein can be used in the practice or testing of embodiments, only some exemplary systems and methods are now described.

FIG. 1 is a system for an on-deck wagering system. This system may include a live event 102, for example, a sporting event such as a football game, basketball game, baseball game, hockey game, tennis match, golf tournament, eSports or digital game, etc. The live event 102 will include some number of actions or plays, upon with a user or bettor or customer can place a bet or wager, typically through an entity called a sportsbook. There are numerous types of wagers the bettor can make, including, but not limited to, a straight bet, a money line bet, a bet with a point spread or line that the bettor's team would need to cover if the result of the game with the same as the point spread the user would not cover the spread, but instead the tie is called a push. If the user is betting on the favorite, they are giving points to the opposing side, which is the underdog or longshot. Betting on all favorites is referred to as chalk. This is typically applied to round-robin or other tournaments' styles. There are other types of wagers, including parlays, teasers, and prop bets, that are added games that often allow the user to customize their betting by changing the odds and payouts they receive on a wager. Certain sportsbooks will allow the bettor to buy points, to move the point spread off of the opening line. This will increase the price of the bet, sometimes by increasing the juice, vig, or hold that the sportsbook takes. Another type of wager the bettor can make is an over/under, in which the user bets over or under a total for the live event 102, such as the score of American football or the run line in baseball, or a series of action in the live event 102. Sportsbooks have several bets they can handle, a limit of wagers they can take on either side of a bet before they will move the line or odds off of the opening line. Additionally, there are circumstances, such as an injury to an important player such as a listed pitcher, in which a sportsbook, casino, or racino will take an available wager off the board. As the line moves, there becomes an opportunity for a bettor to bet on both sides at different points spreads in order to middle and win both bets. Sportsbooks will often offer bets on portions of games, such as first-half bets and half-time bets. Additionally, the sportsbook can offer futures bets on live events in the future. Sportsbooks need to offer payment processing services in order to cash out customers. This can be done at kiosks at the live event 102 or at other locations.

Further, embodiments may include a plurality of sensors 104 that may be used such as motion sensors, temperature sensors, humidity sensors, optical sensors and cameras such as an RGB-D camera which is a digital camera capable of capturing color (RGB) and depth information for every pixel in an image, microphones, radiofrequency receiver, a thermal imager, a radar device, a lidar device, an ultrasound device, a speaker, wearable devices, etc. Also, the plurality of sensors 104 may include tracking devices, such as RFID tags, GPS chips, or other such devices embedded on uniforms, in equipment, in the field of play, in the boundaries of the field of play, or on other markers on the field of play. Imaging devices may also be used as tracking devices such as player tracking that provides statistical information through real-time X, Y positioning of players and X, Y, Z positioning of the ball.

Further, embodiments may include a cloud 106 or a communication network that may be a wired and/or a wireless network. The communication network, if wireless, may be implemented using communication techniques such as visible light communication (VLC), worldwide interoperability for microwave access (WiMAX), long term evolution (LTE), wireless local area network (WLAN), infrared (IR) communication, public switched telephone network (PSTN), radio waves, and other communication techniques that are known in the art. The communication network may allow ubiquitous access to shared pools of configurable system resources and higher-level services that can be rapidly provisioned with minimal management effort, often over the internet, and relies on sharing of resources to achieve coherence and economies of scale, like a public utility. In contrast, third-party clouds allow organizations to focus on their core businesses instead of expending resources on computer infrastructure and maintenance. The cloud 106 may be communicatively coupled to a peer-to-peer wagering network 114, which may perform real-time analysis on the type of play and the result of the play. The cloud 106 may also be synchronized with game situational data, such as the time of the game, the score, location on the field, weather conditions, and the like, which may affect the choice of play utilized. For example, in an exemplary embodiment, the cloud 106 may not receive data gathered from the sensors 104 and may, instead, receive data from an alternative data feed, such as Sports Radar®. This data may be compiled substantially immediately following the completion of any play, and the data from this feed may be compared with a variety of team data and league data based on a variety of elements, including down, possession, score, time, team, and so forth, as described in various exemplary embodiments herein.

Further, embodiments may include a mobile device 108 such as a computing device, laptop, smartphone, tablet, computer, smart speaker, or I/O devices. I/O devices may be present in the computing device. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers. Devices may include a combination of multiple input or output devices, including, e.g., Microsoft KINECT, Nintendo Wii mote for the WIT, Nintendo WII U GAMEPAD, or Apple iPhone. Some devices allow gesture recognition inputs by combining some of the inputs and outputs. Some devices allow for facial recognition, which may be utilized as an input for different purposes, including authentication and other commands. Some devices provide for voice recognition and inputs, including, e.g., Microsoft KINECT, SIRI for iPhone by Apple, Google Now, or Google Voice Search. Additional user devices have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality, including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices, display devices, or groups of devices may be augmented reality devices. An I/O controller may control the I/O devices. The I/O controller may control one or more I/O devices, such as e.g., a keyboard and a pointing device, e.g., a mouse or optical pen. Furthermore, an I/O device may also contain storage and/or an installation medium for the computing device. In still other embodiments, the computing device may include USB connections (not shown) to receive handheld USB storage devices. In further embodiments, an I/O device may be a bridge between the system bus and an external communication bus, e.g., a USB bus, a SCSI bus, a FireWire bus, an Ethernet bus, a Gigabit Ethernet bus, a Fiber Channel bus, or a Thunderbolt bus. In some embodiments, the mobile device 108 could be an optional component and would be utilized in a situation where a paired wearable device utilizes the mobile device 108 as additional memory or computing power or connection to the internet.

Further, embodiments may include a wagering software application or a wagering app 110, which is a program that enables the user to place bets on individual plays in the live event 102 and display the audio and video from the live event 102, along with the available wagers on the mobile device 108. The wagering app 110 allows the user to interact with the wagering network 114 to place bets and provide payment/receive funds based on wager outcomes.

Further, embodiments may include a mobile device database 112 that may store some or all of the user's data, the live event 102, or the user's interaction with the wagering network 114.

Further, embodiments may include the wagering network 114, which may perform real-time analysis on the type of play and the result of a play or action. The wagering network 114 (or the cloud 106) may also be synchronized with game situational data, such as the time of the game, the score, location on the field, weather conditions, and the like, which may affect the choice of play utilized. For example, in an exemplary embodiment, the wagering network 114 may not receive data gathered from the sensors 104 and may, instead, receive data from an alternative data feed, such as SportsRadar®. This data may be provided substantially immediately following the completion of any play, and the data from this feed may be compared with a variety of team data and league data based on a variety of elements, including down, possession, score, time, team, and so forth, as described in various exemplary embodiments herein. The wagering network 114 can offer several software as a service managed services such as user interface service, risk management service, compliance, pricing and trading service, IT support of the technology platform, business applications, game configuration, state-based integration, fantasy sports connection, integration to allow the joining of social media, as well as marketing support services that can deliver engaging promotions to the user.

Further, embodiments may include a user database 116, which may contain data relevant to all users of the wagering network 114, which may include, but is not limited to, a user ID, a device identifier, a paired device identifier, wagering history, and wallet information for the user. The user database 116 may also contain a list of user account records associated with a respective user ID. For example, a user account record may include information such as user interests, user personal details such as age, mobile number, etc., sporting events played before, highest wager, favorite sporting event, and current user standings and balance corresponding to the user ID. In addition, the user database 116 may contain betting lines and search queries. The user database 116 may be searched based on a search criterion received from the user. Each betting line may include a plurality of betting attributes such as at least one of the live event 102, a team, a player, an amount of wager, etc. The user database 116 may include information related to all the users involved in the live event 102. In one example, the user database 116 may include information for generating a user authenticity report and a wagering verification report. Further, the user database 116 may be used to store user statistics like, but not limited to, the retention period for a particular user, frequency of wagers placed by a particular user, the average amount of wager placed by each user, etc.

Further, embodiments may include a historical play database 118 that may contain play data for the type of sport being played in the live event 102. For example, in American Football, for optimal odds calculation, the historical play data may include metadata about the historical plays such as time, location, weather, previous plays, opponent, physiological data, etc.

Further, embodiments may utilize an odds database 120 that contains the odds calculated by an odds calculation module 122 to display the odds on the user's mobile device 108 and take bets from the user through the mobile device wagering app 110.

Further, embodiments may include the odds calculation module 122, which utilizes historical play data to calculate odds for in-play wagers Further, embodiments may include a next play wager module 124, which calculates the odds on non-current plays based upon the most likely context of the non-current play based on the predicted outcome of the current play. Non-current plays are related to plays that would occur outside the current play or bet. For instance, when a batter is up in a baseball game, there are play events to bet on inside that play, such as will the next pitch result in a ball, a strike, etc., but a play outside the play event could be a pitcher change for the next batter, or whether the next batter will walk. The next play wager module 124, may initiate a next players module 126. Once the list of the of potential next plays is received, the next player wager module 126 looks up the players list in the historical plays database 118 to see if these players have enough plays (say >500) against the event (such as the current pitcher). If there are enough plays, then the next play wager module 124 calculates the odds for the next plays that could be made, for instance, 2:1 for a strikeout, 3:1 for a single, etc. The next play wager module 124 may initiate a next plays module 128. Once the list of the next plays is received, the next play wager module 124 looks up the plays possibilities in the historical plays database 118 to see if these plays have enough plays (for example >500) against the event. For example, the context of the current play may be one out in the eighth inning with no runners on base. The context of the next play may be one out and with a runner on first. Multiple outcomes of the current play may result in the next play being in that context. The current player may get a hit, a walk, being hit by a pitch, reaching on an error, or by catcher's interference. The odds of each outcome on the current play may be combined to produce the next play's odds in the context. The odds of at least one outcome of the next play may be combined with the odds of that context to create odds on the outcome of the next play. For example, the next play could be the current player gets on base and then steals the next base, or the current player gets on base and the next player does a sacrifice fly ball out, etc. If there are enough plays, then the next play wager module 124 calculates the odds for the next plays that could be made, for instance, 2:1 odds that the current player gets on base and then steals the next base, 3:1 odds that the current player gets on base and next player does a sacrifice fly ball out, etc. The next play wager module 124, then searches a possible play database 130 for other potential micro plays outside the current play event. For instance, it may evaluate the rules portion of the possible play database 130 to see if substitute players are permitted in baseball based upon the current play. The next play wager module 124, looks up the plays possibilities in the historical plays database 118 to see if these plays have enough plays (for example >500) against the event. For example, a substitution may be made on the next play. If there are enough plays, then the next play wager module 124 calculates the odds for the next plays that could be made, for instance, 2:1 odds that a substitution is made. The next play wager module 124 then sends this data to the wagering app 110 on the mobile device 108 to offer these new bets outside the current play or bet to be bet on by the user. It may be understood by those of ordinary skill in the art that there are many methods to track betting and results in each game.

Further, embodiments may include the next players module 126, which may be initiated by the next play wager module 124. The next players module 126 determines from a 3rd party sports database the current next players, such as the lineup of players on the roster. For baseball, the batting order or batting lineup is the sequence in which the members of the offense take their turns in batting against the pitcher. The batting order is the main component of a team's offensive strategy. In Major League Baseball, the batting order is set by the manager, who before the game begins must present the home plate umpire with two copies of his team's lineup card, a card on which a team's starting batting order is recorded. The home plate umpire keeps one copy of each team's lineup card and gives the second copy to the opposing manager. Once the home plate umpire gives the lineup cards to the opposing managers, the batting lineup is final, and a manager can only make changes under the official baseball rules governing substitutions. If a team bats out of order, it is a violation of baseball's rules and subject to penalty. In American football, the next players are more difficult to determine as there are unlimited free substitutions, but for a specific play, the players are known. The specific role that a player takes on the field is referred to as their position. Under the modern rules of American football, both teams are allowed 11 players on the field at one time and have unlimited free substitutions, meaning that they may change any number of players during any "dead ball" situation. This has resulted in the development of three task-specific "platoons" of players within any single team: the offense, which is the team with possession of the ball, which is trying to score; the defense, which is the team trying to prevent the other team from scoring and to take the ball from them; and the so-called "special teams", who play in all kicking situations. Within these three separate "platoons," various positions exist depending on the job that the player is doing. The next players module 126 returns the list of the next players, for instance the next players to be at-bat in baseball, to the next play wager module 124.

Further, embodiments may include the next plays module 128, which may be initiated by the next play wager module 124. The next plays module 128, evaluates the current play event and then uses the data in the possible play database 130 to determine which plays could potentially be the next play of the live event 102. For instance, if the current play event is a batter up against a pitcher, and the count is two balls and one strike, a micro play cannot be a strikeout on the next pitch but could be a foul ball, a bunt, etc. So, these plays could realistically be the next play of the live event 102. The next plays module 128 returns the list of possible next plays to the next play wager module 124.

Further, embodiments may include the possible play database 130, which may store (for each sport) all the possible plays available. For instance, a pitch to a batter in baseball can result in a swinging strike, looking strike, foul ball, a hit, a bunt, a called strike, a ball, etc. In other sports like football, they can run, pass, kick, etc. The possible play database 130 may also store possible "event plays" that impact which plays are available as the next play. For instance, in baseball, it can be three outs in an inning, nine innings in a game; or in football, how many yards to a first down, how many attempts remaining to achieve a first down, how many quarters, etc. The possible play database 130 may also store rules of the game, such as in baseball, what is allowed in a tie after the 9th inning; or in football what happens in the field of play, the duration of the match, the start and restart of plays, etc.

Figure 2:
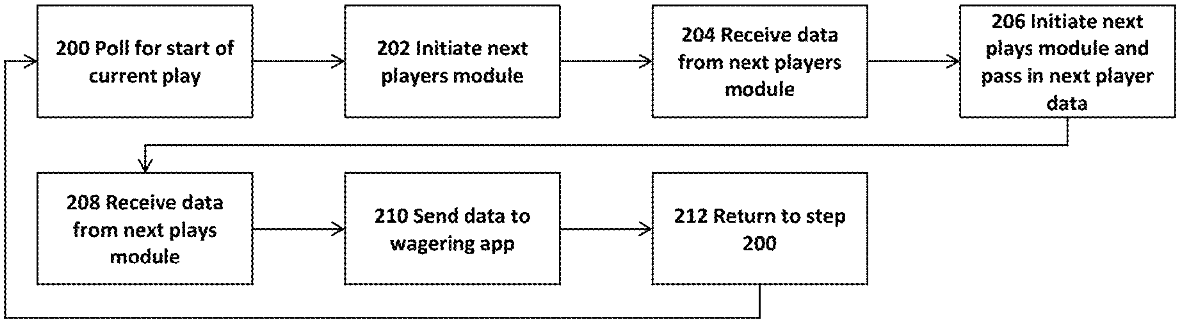
FIG. 2 illustrates a next play wager module, according to an embodiment.

FIG. 2 illustrates the next play wager module 124. The process begins with the next play wager module 124 polling, at step 200, for the end of the play of the live event 102. This data may be obtained via the sensors 104 of the live event 102. The next play wager module 124, may collect data on the current play until enough data has been collected to calculate the odds of each next play accurately, but before the outcome of the current play has been decided. This amount of data can be considered a threshold amount of data needed to accurately calculate odds and, once that threshold is met, data may stop being collected. The next play wager module 124 initiates, at step 202, the next players module 126. The next play wager module 124 receives, at step 204, data from the next players module 126 on which players may be involved in the next play and the odds of those players being involved in the next play. The next play wager module 124 initiates, at step 206, the next plays module 128 and passes on the data from the next players module 126. The next play wager module 124 receives, at step 208, data from the next plays module 128 on which plays may be the next play of the live event 102 and the odds of each play being the next play of the live event 102. The next play wager module 124 sends, at step 210, the possible next plays and odds received from the next plays module 128 to the wagering app 110 on the mobile device 108. The odds may be adjusted at this step to account for factors such as profit and risk. Users may then be able to place wagers on what the next play of the game may be, which players may be part of the next play, or both. There are a number of ways that the odds of a substitution on the next play and the odds on the context of the play may be combined to create odds on a subsequent play. In an embodiment, the odds of substitution in a given scenario may impact the odds of one or more potential outcomes of the next play based on the players available for a given substitution. For example, Aaron Judge is at-bat with no runners on base against Clayton Kershaw with two outs in the eighth inning of a game that the Dodgers lead three to one. Being down by two runs may make the odds of a walk increase as it is common practice in baseball to try for a walk, when possible, to bring the game-tying run to the plate. Left-hand hitting Brett Gardner is on deck. Both Clayton Kershaw and Brett Gardner being left-handed may increase the odds of Brett Gardner being substituted for a right-handed batter if Aaron Judge gets on base to continue the inning. It may be determined based on the active roster and the historical plays database 118 that the most likely substitute is Giancarlo Stanton. Giancarlo Stanton's historical performance against left-handed pitchers, and Clayton Kershaw specifically, and or as a pinch hitter, may be used to adjust the odds offered to users through the wagering app 110. The next play wager module 124 returns, at step 212, to step 200.

Figure 3:
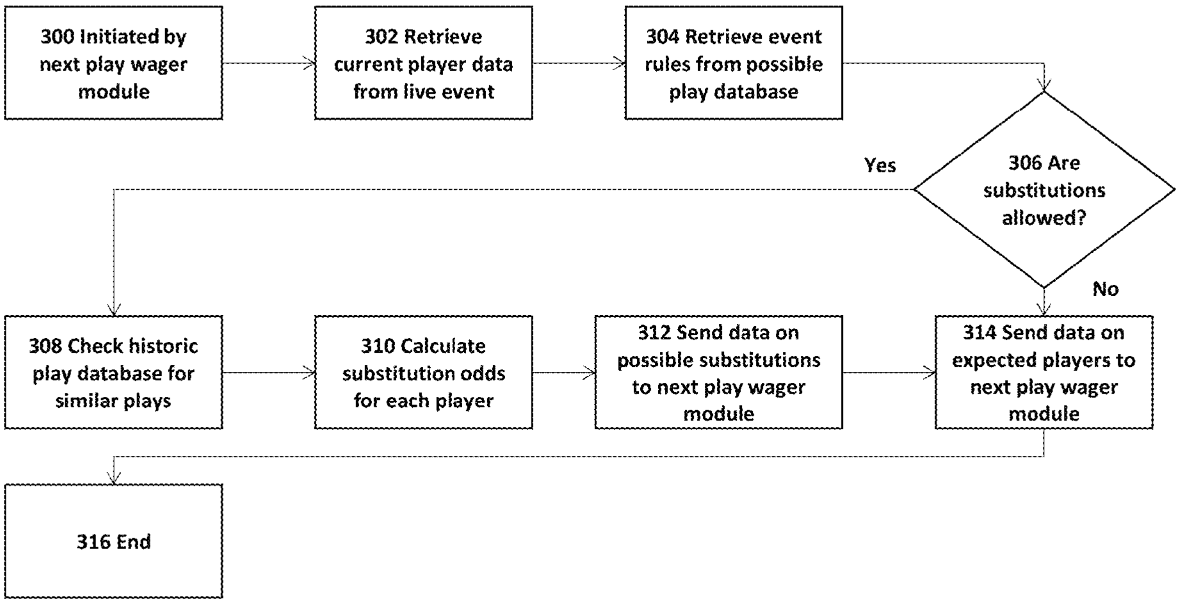
FIG. 3 illustrates a next players module, according to an embodiment.

FIG. 3 illustrates the next players module 126. The process begins with the next players module 126 being, at step 300, initiated by the next play wager module 124. The next players module 126, retrieves, at step 302, data regarding the active players in the live event 102. For example, the current pitcher and batter in a baseball game, along with the current batting order, available reserves, and any pitchers warming up in the bullpen or on-deck circle. The data may be obtained through the sensors 104 at the live event 102. This data may be obtained from a database that stores a player roster. The next players module 126 retrieves, at step 304, the rules of the live event 102 from the possible play database 130. For example, if the live event 102 is a baseball game the next players module 126 will retrieve the rules of baseball from the possible play database 130. Only the subset of rules dealing with the currently active players may need to be retrieved. The next players module 126 determines, at step 306, if substitutions are allowed based on the rules of the live event 102. If substitutions are not allowed the next players module 126 skips to step 314. If substitutions are allowed the next players module 126 checks, at step 308, the historical plays database 118 for plays similar to the current play of the live event 102. The next players module 126 calculates, at step 310, the odds of a substitution for any player that can be substituted. The next players module 126 may first discard any historical substitutions of players not currently present at the live event 102, or that are no longer part of the roster. This data may be obtained via the sensors 104 of the live event 102 or from a database containing team rosters. Then the odds of each player being substituted may be calculated by looking at the total number of similar plays, then looking at how many times that player was substituted in out of all the similar plays. For example, the current play of the live event 102 is set to be a left-handed batter facing off against a left-handed pitcher based on the lineup. The search of the historical plays database 118 returns 500 plays that originally had left-handed batter facing off against a left-handed pitcher in the eighth inning of a game with the batting team trailing by between one and three runs. In 100 of these similar plays a right-handed batter was substituted for the scheduled left-handed batter. Therefore, there is a 100 in 500 (or 20%) estimated chance that a right-handed batter will be at bat instead of a left-handed in the next play of the live event 102. The identity of the pitcher and batter may be used if there are a sufficient number of matchups in the historical plays database 118 for a relevant statistic. For example, the batting team may only have one right-handed batter available to pinch-hit. The statistics of the available batter, such as their batting average, slugging percentage, OPS, etc., against left-handed pitching, against the current pitcher, as a pinch hitter, etc. These statistics may be compared to the available substitute players' statistics, the manager's history of substitutions, etc., to determine if a substitution is less or more likely. For example, the current batter may have favorable statistics against same-side pitchers, also known as a reverse platoon split, and would be less likely to be substituted for. The available substitute batter may have a characteristic that may make him less likely to be used in this scenario, such as being the backup catcher. Baseball teams rarely use their backup catcher as a substitute in case the starting catcher gets hurt or ejected. The next players module 126 sends, at step 312, the data on the possible substitutions and the odds of each to the next play wager module 124. The next players module 126 sends, at step 314, the expected players of the next play without any substitutions to the next play wager module 124. The odds of any expected player being in the next play may be calculated as 100% minus the chance of substituting for that player. The next players module 126 ends at step 316.

Figure 4:
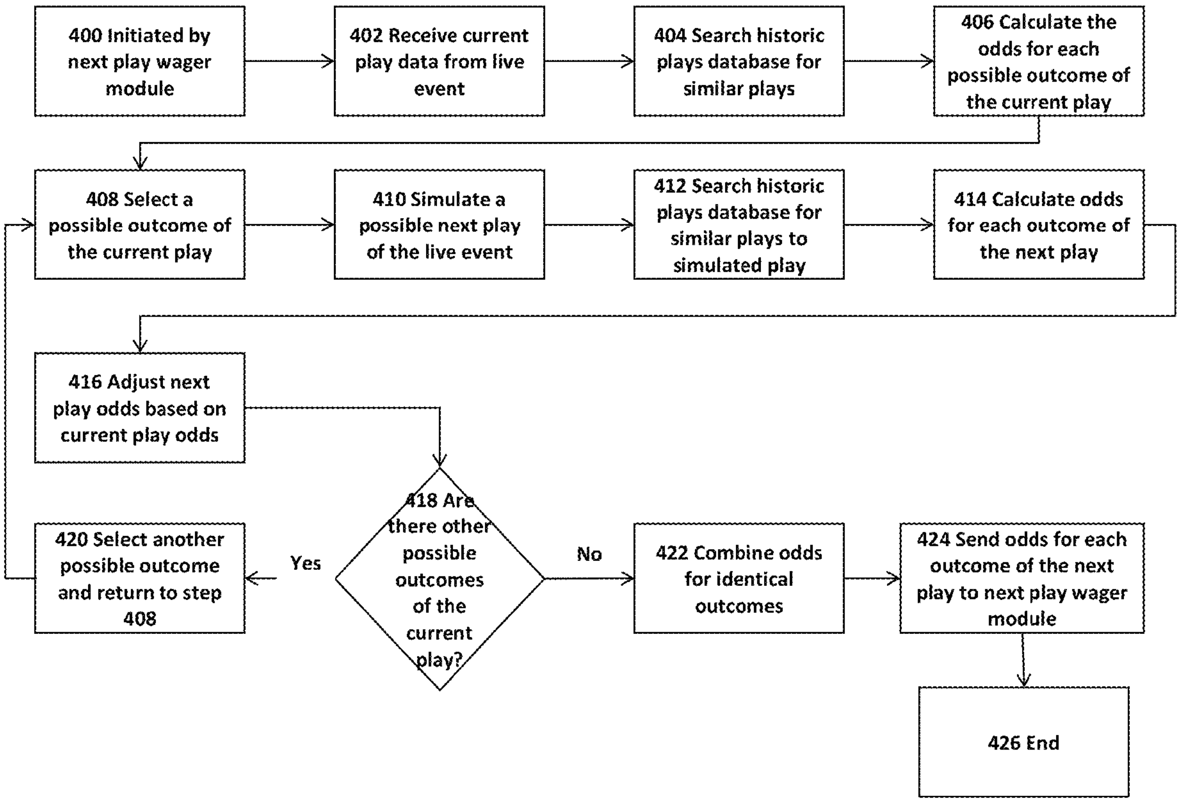
FIG. 4 illustrates a next plays module, according to an embodiment.

FIG. 4 illustrates the next plays module 128. The process begins with the next plays module 128 being initiated, at step 400, by the next play wager module 124. The next plays module 128 may also receive data on the odds of a player substitution as calculated by the next players module 126. The next plays module 128 retrieves, at step 402, current play data from the live event 102. For example, the play may be the bottom of the eighth inning, and two outs in baseball, and the Yankees are at-bat. This data may be obtained via the sensors 104 of the live event 102. The next plays module 128 searches, at step 404, the historical plays database 118 for plays similar to the current play of the live event 102. The next plays module 128 calculates, at step 406, the odds of each outcome of the current play of the live event 102 based on similar historic plays. For example, if, out of 500 similar plays, 200 resulted in a strikeout, then the calculated odds of a strikeout on the current play of the live event 102 would be 200 out of 500 (or 40%). The next plays module 128 selects, at step 408, one of the possible play outcomes such as a strikeout, single, homerun, etc. The next plays module 128 may additionally use the received odds of a player substitution from the next players module 126 to create a possible outcome. For example, the current play's possible outcome may be a single and then a pinch hitter substitution, instead of just a single with the expected hitter. The odds for these outcomes may be calculated by multiplying the odds for the play result by the odds of the next player. For example, if there is a 20% chance of the play resulting in a single and a 10% chance of the expected hitter to be substituted by a pinch hitter, then the odds of an outcome where both occur is 2%. The next plays module 128 simulates, at step 410, a possible next play of the live game 102 based on the outcome selected in step 408. For example, the current play is bottom of the third inning, and two outs in baseball and the Yankees are at-bat. The selected outcome is a single with no player substitution. Then the simulated play will be the bottom of the third inning and two outs in baseball; the expected next batter is at-bat, and the batter from the current play is on first. The next plays module 128 searches, at step 412, the historical plays database 118 for plays similar to the simulated next play of the live event 102. The next plays module 128 calculates, at step 414, the odds of each outcome of the simulated next play of the live event 102 based on similar historic plays. For example, if out of 500 similar plays 200 were a strikeout, then the calculated odds of a strikeout on the current play of the live event 102 would be 200 out of 500 or 40%. The next plays module 128 may use data from the possible play database 130 to eliminate similar historic plays with outcomes that are not possible given the current state of the live event 102. For example, in the live event 102, the Yankees have two outs, and the selected outcome from step 408 is another out. Then the outcome of the simulated next play could not be a home run for the Yankees since, after three outs, the Yankees would now be pitching due to baseball's rules. The next plays module 128 adjusts, at step 416, the odds of the simulated next play outcome based on the odds of the outcome of the current play that would result in the simulated play. Adjustment may be made by multiplying the odds together. For example, there is a 40% chance the current play will be a single. If the current play results in a single, there is a 10% chance the next play will be a home run. The two probabilities are multiplied together to result in a 4% chance that the actual next play of the live game 102 results in a home run. The next plays module 128 determines, at step 418, if there are other possible outcomes of the current play that have not been selected. If there are other possible outcomes of the current play that have not been selected the next plays module 128 selects, at step 420, another possible outcome and returns to step 408. If there are no other possible outcomes of the current play that have not been selected, the next plays module 128 combines, at step 422, the odds of each identical outcome of the simulated next play. For example, the odds of both current play being a single and the next play being a home run is 4%. The odds of both the current play being a double and the next play being a home run is 2%. Since both of these possible futures have the next play resulting in a home run, the two probabilities may be added together for a probability of 6%. This step may only be necessary for wagers where only the next play is relevant, and the actual result of the current play is not bet on. The next plays module 128 may also normalize all outcomes, such that all possible outcomes total 100%. The next plays module 128 sends, at step 424, the odds for each outcome of the next play to the next play wagering module 124. The next plays module 128 ends at step 426.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for providing one or more wagers for an upcoming action in a live sporting event, comprising:

collecting data about the end of a past play in the live sporting event;

determining that the past play has ended using data collected by one or more sensors;

collecting data about a current play in the live sporting event until a threshold amount of data is collected;

stopping collection of the data of the current play in the live sporting event before the current play is completed;

comparing the collected data about the end of the past play and the collected data about the current play to historical play data;

determining odds on a future action of the live sporting event that will begin after the current play is completed; and displaying the odds on a user device.

2. The method for providing one or more wagers for an upcoming action in a live sporting event of claim 1, wherein the future action is a next play that will take place immediately following the current play.

3. The method for providing one or more wagers for an upcoming action in a live sporting event of claim 1, wherein the future action is a substitution of a player who will enter the live sporting event immediately following the current play.

4. The method for providing one or more wagers for an upcoming action in a live sporting event of claim 1, wherein the future action is a next play that will take place immediately following the current play.

5. The method for providing one or more wagers for an upcoming action in a live sporting event of claim 1, further comprising determining a threshold that triggers the stopping collecting of the data of the current play in the live sporting event before the current play is completed.

6. The method for providing one or more wagers for an upcoming action in a live sporting event of claim 5, wherein the threshold is an amount of data regarding the current play that at least meets a predetermined number of characteristics of a predetermined number of plays in a historical plays database.

7. The method for providing one or more wagers for an upcoming action in a live sporting event of claim 5, wherein the threshold is an amount of time.

8. The method for providing one or more wagers for an upcoming action in a live sporting event of claim 1, further comprising simulating at least one possible next play before determining odds on the future action of the live sporting event that will begin after the current play is completed.

9. A system for providing odds on a future play in a live sporting event before a conclusion of a current play in the live sporting event, comprising:

one or more sensors that determine when a past play in the live sporting event has ended;

data collected from a historical plays database that contains play data for the type of sport being played in the live sporting event;

a next action module that collects data from a current play in the live sporting event, wherein the data from the current play in the live sporting event is collected before the conclusion of the current play, and calculates odds for a next action that will take place after the current play in the live sporting event ends; and a user device which displays the calculated odds for the next action.

10. The system for providing odds on a future play in a live sporting event before a conclusion of a current play in the live sporting event of claim 9, wherein the next action is a next play in the live sporting event.

11. The system for providing odds on a future play in a live sporting event before a conclusion of a current play in the live sporting event of claim 9, wherein the next action is a player substitution in the live sporting event.

12. The system for providing odds on a future play in a live sporting event before a conclusion of a current play in the live sporting event of claim 9, wherein the next action module stops collecting data from the current play upon meeting a threshold that triggers the stopping collecting of the data of the current play in the live sporting event before the current play is completed.

13. The system for providing odds on a future play in a live sporting event before a conclusion of a current play in the live sporting event of claim 9, wherein the next action module simulates at least one possible next play before calculating odds for a next action that will take place after the current play in the live sporting event ends.

* * * * *